United States Patent Office 2,766,189
Patented Oct. 9, 1956

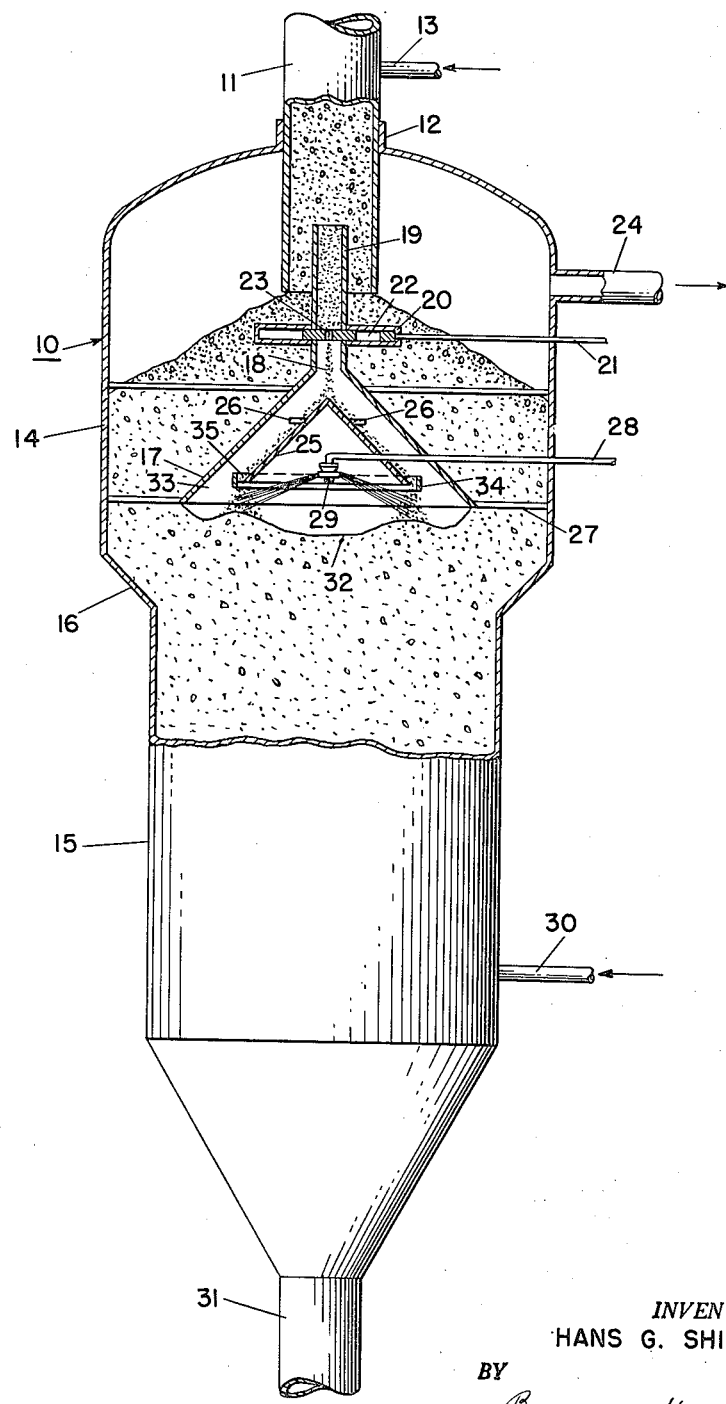

2,766,189

HYDROCARBON CONVERSION

Hans G. Shimp, Springfield, Pa., assignor to Sun Oil Company, Philadelphia, Pa., a corporation of New Jersey Application December 1, 1950, Serial No. 198,525

11 Claims. (Cl. 196—52)

This invention relates to method and apparatus for hydrocarbon conversion and more particularly to method and apparatus for contacting heated liquid hydrocarbons with particle form solid contact material in order to effect hydrocarbon conversion.

According to the present invention, one portion of freshly made or regenerated or reheated particle form contact material at a conversion-supporting temperature is caused to fall freely through an engaging zone, wherein it engages atomized heated liquid hydrocarbon material with resulting evolution of vapors from the latter, which vapors are then passed through a compact bed comprising a second portion of freshly made or regenerated or reheated particle form contact material gravitating downwardly at a conversion-supporting temperature through an upper conversion zone.

Contact material, having fallen freely through the engaging zone falls onto the surface of a compact bed of contact material gravitating through a lower conversion zone situated beneath the engaging zone. Further evolution of vapors from the liquid hydrocarbon material occurs in the lower conversion zone, and such vapors are passed through the upper conversion zone. Substantially dry contact material having carbonaceous materials deposited thereon as residue from the hydrocarbon material is removed from the bottom of the lower conversion zone.

Contact material, having gravitated through the upper conversion zone as a compact mass, joins the compact mass of contact material gravitating through the lower conversion zone.

The present invention provides apparatus for effecting the above results. Method and apparatus according to the invention have advantages as subsequently described in both catalytic and non-catalytic hydrocarbon conversions. In both types of conversion, heated liquid hydrocarbon material is spread on contact material which then gravitates through a lower conversion zone, while vapors evolved from the hydrocarbon material pass upwardly through an upper conversion zone.

The invention will now be described with reference to the attached drawing which is a view partly in elevation and partly in vertical section of apparatus representing one embodiment of the invention.

In the drawing there is represented an apparatus for hydrocarbon conversion comprising a vertical conversion housing 10, having circular or other suitable horizontal cross-section, and having at the top thereof an inlet 11 for particle form solid contact material. The inlet pipe 11 passes through stuffing box 12 and is slidably associated with the top of conversion housing 10. An inlet pipe 13 for gasiform inert sealing medium communicates with inlet pipe 11.

In the illustrated embodiment of the invention, the housing 10 has an upper, relatively expanded shell portion 14 and a lower, relatively constricted shell portion 15, with an inclined deflecting shell member 16 connecting the two portions.

Within the upper portion 14 of housing 10, there is situated an upright frustoconical member 17 constituting a partition positioned transversely of housing 10 and spaced apart from housing 10. Any other suitable such partition can be employed, for example, any other symmetrical upwardly tapered truncated baffle, such as a truncated square, hexagonal, or other pyramid. At the top of member 17 is an aperture 18 constituting a central passage through the partition defined by member 17. Above member 17 and communicating with aperture 18 thereof is a central vertical conduit 19, adapted to receive a portion of the contact material introduced into housing 10 through inlet 11. Horizontal valve member 20 is slidably associated with conduit 19 to restrict the flow of contact material therethrough, and has an operating handle 21 extending through and terminating exteriorly of housing 10. As shown, valve member 20 has two spaced passages 22 and 23. Passage 22 has horizontal cross-section substantially equal to the horizontal cross-section of conduit 19, and passage 23 has horizontal cross-section substantially less than that of conduit 19. Any other suitable type of valve member can be used to provide free fall of of contact material below the valve, e. g. an iris diaphragm as shown in Figure 2 of U. S. Patent 2,458,162 to William A. Hagerbaumer, dated January 4, 1949.

Upright conical member 25 terminates in an apex and is situated substantially directly beneath aperture 18 of member 17. The base plane of member 25 has diameter about half as great as that of member 17 and is on a higher horizontal level than the base plane of member 17. Member 25 is supported by supports 26 in spaced relation to member 17 to provide a passage for contact material therebetween. Member 17 is supported by supports 27 in spaced relation to upper portion 14 of housing 10.

Pipe 28 is adapted to be traversed by liquid hydrocarbon material, and extends from the exterior of housing 10 to the interior thereof. Pipe 28 communicates with and supports an atomizer 29 of any suitable type, for example as disclosed in an application of James E. Evans, Serial No. 756,031, filed June 20, 1947, now U. S. Patent 2,553,561 issued May 22, 1951. Ring 34 is supported by supports 35 in spaced relation about two inches outwardly from the bottom edge of conical member 25. Ring 34 provides annular passage to control dispersion of solid particles as they pass the bottom of conical member 25.

The cross-sectional area of the base plane of member 17 is less than the cross-sectional area of lower portion 15 of housing 10.

Inlet 30 for gasiform stripping medium communicates with the lower portion 15 of housing 10. At the bottom of housing 10 is an outlet 31 for contact material.

Although member 25 is described above as being conical in shape, it is to be understood that it can be any other suitable shape; for example, it can be any other upright symmetrical upwardly tapered baffle, such as a square, hexagonal, or other pyramid, terminating in an apex.

In operation, particle form contact material is introduced through inlet 11 into the upper portion 14 of housing 10. One portion of the contact material enters conduit 19 and gravitates therethrough as a compact mass in the portion of conduit 19 above valve member 20, and as a freely falling stream below valve member 20. Valve member 20 restricts or controls downward flow of contact material through the portion of conduit 19 above valve member 20. Contact material falls freely beneath valve member 20 onto the upper surface 32 of the compact bed of contact material gravitating through the lower portion 15 of housing 10. Contact material falling freely beneath valve member 20 is deflected in its path by conical member 25 and passes through the annulus provided by ring 34 and falls therebeneath as a shower of particles. Atomizer 29 ejects atomized liquid hydrocarbon oil into engagement with contact material, either while falling as a shower of particles or after having fallen upon upper bed surface 32. Vapors evolved upon such engagement pass around the lower edge of partition 17 and upwardly through the compact bed gravitating through the upper conversion zone, and are removed from housing 10 through outlet 24.

Another portion of contact material introduced through inlet 11 gravitates around conduit 19 and around truncated conical member 17 as a compact mass comprising a moving bed of contact material extending from member 17 to the wall of housing 10. This portion of contact material, after passing around member 17 and while moving downwardly by gravity as a compact mass, is deflected by inclined deflecting member 16 toward the longitudinal axis of housing 10. A portion of the contact material thus deflected intermingles with contact material having fallen freely onto the upper bed surface 32. Another portion of the contact material thus deflected gravitates through at least an upper section of the lower portion 15 of housing 10 as a peripheral compact layer of contact material.

It will be noted from the drawing and the above description that atomizer 29 is disposed in a chamber or engaging zone 33 bounded below by upper bed surface 32 and bounded above by truncated conical member 17.

An inert stripping medium is introduced through inlet 30 and suitable distributing means not shown into the compact bed gravitating through lower portion 15 of housing 10. Contact material is withdrawn from the bottom of the bed through outlet 31, for conveyance to suitable regeneration or reheating apparatus. The rate of withdrawal through outlet 31 is substantially equal to the rate of supply through inlet 11.

Inert sealing medium, e. g. steam, is introduced through sealing medium inlet 13 into contact material inlet 11. The pressure differential between inlet 13 and the vapor space above the compact bed in the upper conversion zone is maintained sufficiently great that the vapors in chamber 33 are forced through that compact bed and do not cut off the flow of contact material through valve member 20.

The relative rates of contact material flowing through the engaging zone in chamber 33 and through the upper conversion zone around frustoconical member 17 are subject to variation within the scope of the invention. Generally speaking, the effect of increasing the relative rate of flow through the upper conversion zone is to increase the flow rate ratio of contact material to vapors in the upper conversion zone and thereby to increase the temperature of the vapors leaving the apparatus through outlet 24.

Variation in the relative rates of flow above can be effected by changing the size of the orifice restricting contact material flow through the engaging zone, or with an orifice of given size, changing the rates of introduction of contact material through inlet 11 and of withdrawal of contact material through outlet 31.

It is to be understood that in apparatus according to the invention, instead of the conduit 19, valve member 20, and conical member 25 shown in the drawing, any other suitable means can be employed for providing free fall through chamber 33 of a portion of the contact material introduced into housing 10 through inlet 11. For example, there can be provided a vertical conduit with an annular metering passage at the bottom thereof as shown in U. S. Patent 2,493,036 to Reuben T. Savage et al., dated January 3, 1950. Or, alternatively, in the absence of vertical conduit 19 and valve member 20, an aperture 18 in truncated conical member 17 can be provided having such size that it restricts contact material flow sufficiently that a portion of the contact material introduced into housing 10 through inlet 11 falls freely through chamber 33. Vertical conduit 19 is generally advantageous in that it facilitates obtaining uniformity in the distribution of the contact material falling freely through chamber 33. Nevertheless, it can if desired be omitted as described above from apparatus according to the invention.

The conical member 25 has primary function the dispersing of freely falling contact material into a curtain or shower of particles. Although such dispersing is not essential to the invention and conical member 25 can accordingly be absent in apparatus according to the invention, provided means are present for causing free fall of contact material through chamber 33, nevertheless, such dispersing is advantageous in that it permits the bed surface 32 to be maintained more nearly level than when such dispersing is not effected, and thus reduces the tendency of liquid hydrocarbon to become disadvantageously concentrated at low points in the surface 32.

Apparatus according to the invention is constructed with sufficient space between the bottom of frustoconical member 17 and the wall of housing 10 so that, in operation, the velocity of the vapor passing through that space is not so great as to impede the smooth flow of the downwardly moving bed of contact material. The actual dimensions of apparatus which will give this condition vary widely with a plurality of factors, but given a specific set of factors, they can be readily determined, in the light of the present specification, by a person skilled in the art.

In apparatus according to the invention, the partition 17 which bounds the engaging zone is preferably, as shown in the drawing, frustoconical in shape with an aperture at the apex and with sidewalls inclined at an angle with the horizontal within the approximate range 45–65°. Angles less than 45° tend to cause stagnation in the solids bed above the partition, and angles greater than 65° result in partitions having inconveniently great vertical height. The deflecting member within the engaging zone is, when present in apparatus according to the invention, preferably conical in shape with side walls inclined at the same angle as those of the partition.

In apparatus according to the present invention, when a conical member as represented by numeral 25 in the drawing is employed in conjunction with a frustoconical member, as indicated by number 17, the diameter of the base plane of the member 25 is preferable about half, say within the range one-third to two-thirds, of the diameter of the base plane of the member 17, because such dimensions generally provide an advantageous degree of dispersion of freely falling particles over the bed surface 32. Also the vertical distance between the inclined surfaces of members 17 and 25 has magnitude such that sufficient space for unrestricted travel of solids between those surfaces is provided, yet such that the base plane of member 25 is higher to an advantageous degree than the base plane of member 17. For most sizes of apparatus that commonly are employed, e. g. apparatus where the base plane of member 17 has about ten-foot diameter, a vertical distance of 4 inches or greater is sufficient, though larger distances can be used; in apparatus which is substantially larger, the distance between the inclined surfaces will be greater. A ring 34, as shown in the drawing, does not have to be employed in apparatus according to the invention. However, when such ring is employed, it is preferably spaced about two inches outwardly from the bottom edge of member 25.

In apparatus according to the invention, the inclined deflecting shell member, represented as 16 in the drawing, is preferably inclined at an angle with the horizontal within the approximate range 45–65°, because without causing a disadvantageous degree of stagnation in the solids bed directly above the deflecting member, such angles do result in a relatively slow rate of travel of solids near the wall of the deflecting member, so that such solids near the wall become advantageously engaged with more liquid hydrocarbon than they would be if they moved downwardly as fast as the particles nearer the atomizer 29.

Method and apparatus according to the invention are advantageously used in catalytic and in non-catalytic hydrocarbon conversions.

When the apparatus as pictured in the drawing is used in non-catalytic hydrocarbon conversion, such as for example thermal viscosity breaking, coking, or cracking of heavy hydrocarbons, the contact material is introduced at a suitable conversion-supporting temperature, e. g. 800–1200° F., and comprises suitable contact material, e. g. petroleum coke, fused silica or alumina, zirkite, corhart, mullite, silicon carbide, heat-resistant quartz, metal balls, etc. Suitable contact material sizes include major dimensions of $1/16''$ to $3/4''$. The hydrocarbon material is introduced at a suitable elevated temperature, e. g. 600–900° F., and comprises suitable charge stock for liquid feed, non-catalytic conversion, e. g. crude petroleum, reduced crude, or other petroleum residue, the hydrocarbon material is generally introduced at elevated pressure, e. g. 0–50 pounds per square inch gauge.

Method and apparatus according to the invention have important advantages in non-catalytic hydrocarbon conversion as described above. One advantage resides in the fact that gasiform products are obtained which are substantially free of impurities which frequently tend to be present in vapors as originally evolved from the hydrocarbon feed. Many hydrocarbon materials contemplated for non-catalytic conversion according to the present invention contain heavy metal compounds, e. g. oxides of vanadium, chromium, or nickel, which tend to be entrained by and to contaminate vapors evolved from the oils upon contact with contact material. According to the invention, the upper conversion zone acts as a scavenging zone to effect contact of evolved contaminated vapors with fresh or regenerated or reheated contact material, in order that by such contact the contaminants are removed from the vapors. If there were no scavenging zone, these deleterious contaminants would, if present in the hydrocarbon feed stock, be found in the product vapor stream.

Another advantage of the present invention resides in the fact that "overcracking" of the gasiform products is minimized; overcracking referring to vapor decomposition reactions tending to occur upon contact of the vapors with heated contact material. By providing as in the present invention, a scavenging zone separate from the lower conversion zone, it is possible to have a scavenging bed substantially less deep than the lower conversion zone bed, thereby making it possible to independently control the residence time of vapors in the scavenging bed, and to reduce overcracking to as low a degree as desired. According to a specific embodiment of the invention, apparatus is provided wherein the depth of the scavenging bed can be easily varied, and the residence time of vapors in the scavenging bed thereby varied as desired. Referring to the drawing, inlet 11 can be moved vertically upwardly or downwardly in order to raise or lower respectively the level of the surface of the scavenging bed.

The above advantages are of particular importance in certain hydrocarbon conversions where heavy hydrocarbon materials are contacted with inert contact material in order to produce vapors suitable for subsequent catalytic conversion. Such vapors should be as free as possible from heavy metal and other contaminants, since those contaminants are catalyst poisons, i. e. they have adverse effect on conversion catalyst when allowed to come in contact therewith, and such vapors are accordingly advantageously passed through a scavenging zone according to the present invention. It is also advantageous that such vapors be overcracked to as slight a degree as possible; otherwise their value as charge stock for subsequent catalytic hydrocarbon conversion will be impaired. The present invention provides means for minimizing overcracking of such vapors.

When apparatus according to the invention is used in non-catalytic conversion, and when the upper conversion zone functions as a scavenging zone for removal of heavy metal compounds from evolved vapors, the residence time of vapor in the upper conversion zone can sometimes be as low as about five seconds to provide sufficient removal of heavy metal compounds. In other cases, 30–60 seconds residence time may be required. Higher residence times in the scavenging zone can, of course, be used if desired. The residence time of contact material in the lower conversion zone is generally about 10–60 minutes. The weight ratio of contact material, charged to the apparatus through inlet 11, to hydrocarbon material charged to atomizer 29 is generally within the approximate limits 2 to 1 and 10 to 1. The weight ratio of contact material to vapor passing through the scavenging zone is generally within the approximate limits 0.5 to 1 and 5 to 1.

In the apparatus shown in the drawing, the frustoconical member 17 is closer to inlet 11 than to outlet 31, with the result that the upper conversion zone is less deep than the lower conversion zone. Such apparatus is well adapted for use in non-catalytic conversions where the upper conversion zone acts as a scavenging zone and does not need to be deep, since most of the conversion takes place in the engaging zone and lower conversion zone.

It is to be understood, however, that apparatus advantageous for use in catalytic conversions results when the partition which separates the upper conversion zone from the lower conversion zone is nearer the outlet than the inlet, so that the upper conversion zone is the deeper. When this is the case, the vapors evolved upon contact of atomized liquid hydrocarbon with catalyst particles press upwardly through the upper conversion zone and are subjected to conversion therein. Such operation is advantageous in that the countercurrent flow of vapor and catalyst in the upper conversion zone results in less attrition of the catalyst particles than occurs when vapor and catalyst move concurrently downward.

When, for example, apparatus according to the invention is used in catalytic cracking, the contact material introduced into the housing through the solids inlet is a suitable conversion-supporting temperature, e. g. 800–1200° F., and comprises suitable cracking catalyst, e. g. natural or activated clay, silica, alumina, synthetic silica-alumina catalyst, alone or with certain metallic oxides added, the catalyst being in suitable form, e. g. lump, pelleted, or extruded. Suitable catalyst particle sizes include major dimensions of $1/16''$ to $3/4''$. The hydrocarbon material introduced into the atomizer is at a suitable elevated temperature, e. g. 400–800° F., is substantially free from heavy metal compounds, and comprises suitable charge stock for liquid-feed catalytic cracking, e. g. heavy gas oil or deasphalted reduced crude petroleum or other petroleum residue; the hydrocarbon material is generally introduced at elevated pressure, e. g. 10–200 pounds per square inch gauge. Other types of catalytic hydrocarbon conversion than cracking can be effected, e. g. desulfurization, reforming or dehydrogenation of naphtha, etc., in the presence of suitable catalyst, such as the above or other known catalyst.

Method and apparatus according to the invention are further advantageous, whether used in catalytic or in non-catalytic conversions, in that a compact mass of contact material is provided between the wall of vertical housing 10 and the spray of atomized hydrocarbon material ejected from atomizer 29, thus preventing the liquid from being sprayed directly on the wall, and forming carbonaceous deposits thereon.

Apparatus as shown in the drawing, with inclined shell portion 16 connecting upper, relatively expanded shell portion 14 and lower, relatively constricted shell portion 15, has the added advantage that the distribution of liquid hydrocarbon material is made more uniform by deflecting contact material, which has not passed through the engaging zone, toward the longitudinal axis of the lower conversion zone, thus promoting the mixing of contact material which has contacted liquid hydrocarbon material in the engaging zone with contact material which has instead passed through the upper conversion zone. The advantage of having the cross-section of lower shell portion 15 larger than the cross-section of the base of frustoconical member 17 is that this allows a portion of the deflected contact material to pass through an upper portion of the lower conversion zone as a layer of contact material separating liquid-contacted contact material from the wall of housing 10 and preventing coking on the wall. As the contact material gravitates downwardly through the lower conversion zone, this layer of contact material gradually intermixes with liquid-contacted contact material, but by this time the latter contact material has substantially lost by vaporization its liquid coating and can contact the housing wall without causing excessive coking.

In my copending application, Serial No. 198,526 filed December 1, 1950, there is disclosed and claimed a method of converting hydrocarbon, similar in some respects to that claimed herein, and additionally involving passage of separately introduced hydrocarbon vapors throughout the vertical length of a combined conversion zone comprising upper and lower conversion zones.

I claim:

1. Apparatus for converting hydrocarbon oil which comprises: a vertical conversion housing having a lower outlet for particle-form solid contact material and providing within said housing a space for travel of such contact material as a compact mass; within said housing, a transverse partition having an aperture therein, said partition providing between it and the wall of said housing an annular passage for downflow of a first portion of contact material to a lower part of said housing and providing beneath said aperture a chamber for passage of a second portion of contact material as a falling stream therethrough; means for introducing a first portion of particle-form solid contact material onto the upper surface of said transverse partition and for introducing a second portion of particle-form solid contact material into said chamber and therethrough as a falling stream, said means for introducing said first portion of contact material including a substantially vertical conduit concentric with said transverse partition; said partition being adapted to divide said compact mass into an upper compact mass, gravitating through said annular passage, and a lower compact mass having the outer edge of its upper surface coinciding with the outer edge of said partition, said upper surface defining the lower boundary of said chamber; a conduit for hydrocarbon oil; at the end of said conduit, an atomizer positioned within said chamber above said upper surface of said lower compact mass and adapted to spray said oil downwardly and laterally toward said falling stream and toward said upper surface of said lower compact mass; and means situated above the lowermost portion of said partition for removing conversion products from said housing after passage through said upper compact mass.

2. Apparatus according to claim 1 wherein a valve member is situated substantially directly above said aperture, which valve member is adapted to restrict downward flow of contact material therethrough.

3. Apparatus according to claim 1 and additionally comprising a substantially vertical conduit communicating at its lower end with said aperture and having its upper end adapted to receive solids introduced through the first-named substantially vertical conduit.

4. Apparatus according to claim 1 wherein said partition is a substantially symmetrical upwardly tapered truncated baffle.

5. Apparatus according to claim 4 and additionally comprising a substantially symmetrical upwardly tapered baffle terminating in an apex, said baffle being situated substantially directly above said atomizer and substantially directly beneath said aperture, the base level of said upwardly tapered baffle being substantially above the base level of said truncated baffle.

6. Apparatus according to claim 1 wherein said vertical conduit is vertically slidably associated with the top of said housing.

7. Apparatus according to claim 1 wherein said housing comprises an upper portion and a lower portion beneath the level of said atomizer, the horizontal cross-section of said lower portion being substantially less than the horizontal cross-section of said upper portion and substantially greater than the horizontal cross-section of the base of said partition.

8. Method for converting hydrocarbon oil which comprises dividing particle form solid contact material into a first portion and a second portion; passing said first portion of particle form solid contact material downwardly by gravity at conversion temperature as a compact mass consisting essentially of liquid-free contact material through an upper conversion zone; passing said second portion of particle-form solid contact material at conversion temperature through an engaging zone as a falling stream; introducing atomized liquid hydrocarbon oil into said engaging zone and into engagement with at least part of said second portion of said contact material; passing contact material downwardly as a peripheral compact mass from said upper conversion zone passing evolved vapors upwardly through said peripheral compact mass and through said compact mass in said upper conversion zone; removing contact material downwardly by gravity from said peripheral compact mass and from said engaging zone; passing contact material thus removed from said peripheral compact mass and from said engaging zone downwardly together by gravity as a second compact mass through a lower conversion zone; passing evolved vapors from said second compact mass upwardly through said second compact mass in said lower conversion zone and upwardly through said peripheral compact mass and through said first-named compact mass in said upper conversion zone; removing evolved vapors from the upper surface of said first-named compact mass; and withdrawing contact material from said lower conversion zone.

9. Method according to claim 8 wherein said contact material is inert contact material.

10. Method according to claim 8 wherein said contact material is catalyst, and wherein said atomized liquid hydrocarbon oil is substantially free from catalyst poisons.

11. The method of converting hydrocarbon oil which comprises: including particle form solid contact material into a contacting zone having an upper section comprising a central engaging zone and a peripheral upper conversion zone and having a lower section comprising a lower conversion zone substantially directly beneath said engaging zone; dividing said particle form solid contact material into a first portion and a second portion; passing said first portion of said contact material thus introduced through said engaging zone as a falling stream; passing said second portion of said contact material thus introduced as a compact mass consisting essentially of liquid-free contact material through said upper conversion zone; deflecting said second portion of said contact material, having passed through said upper conversion zone and while moving downwardly by gravity as a compact mass into said lower conversion zone, toward the longitudinal axis of said contacting zone; passing a portion of the thus deflected contact material downwardly by gravity as a peripheral compact layer through an upper portion of said lower conversion zone; removing contact material downwardly by gravity from said engaging zone; passing contact material thus removed from said engaging zone as a central compact mass downwardly by gravity through an upper portion of said lower conversion zone; commingling in the lower portion of said lower conversion zone said portion of the thus deflected contact material and said contact material thus removed from said engaging zone; introducing atomized hydrocarbon oil into said engaging zone and into engagement with at least a substantial portion of said first portion of said contact material; passing vapors evolved from said hydrocarbon oil upon contact with contact material upwardly through said second portion of said contact material in said upper conversion zone.

References Cited in the file of this patent

UNITED STATES PATENTS

| | | |
|---|---|---|
| 2,438,261 | Utterback | Mar. 23, 1948 |
| 2,439,348 | Simpson et al. | Apr. 6, 1948 |
| 2,489,628 | Evans | Nov. 29, 1949 |
| 2,490,828 | Newton | Dec. 13, 1949 |
| 2,492,998 | Lassiat | Jan. 3, 1950 |
| 2,553,561 | Evans | May 22, 1951 |
| 2,556,198 | Lassiat | June 12, 1951 |
| 2,558,769 | McKinney | July 3, 1951 |
| 2,560,343 | Hemminger | July 10, 1951 |
| 2,565,811 | Hall | Aug. 28, 1951 |
| 2,566,353 | Mills | Sept. 4, 1951 |